(12) United States Patent
Stockert et al.

(10) Patent No.: US 9,968,974 B2
(45) Date of Patent: May 15, 2018

(54) ASSEMBLY AND METHOD FOR REMOVING A ROBOT FROM AN ENCLOSURE

(71) Applicant: FIVES CINETIC CORPORATION, Farmington Hills, MI (US)

(72) Inventors: David L. Stockert, New Boston, MI (US); Kevin A. Heikkinen, Milford, MI (US); Timothy P. Tristani, Lake Orion, MI (US)

(73) Assignee: Fives Cinetic Corporation, Farmington Hills, MI (US)

( * ) Notice: Subject to any disclaimer, the term of this patent is extended or adjusted under 35 U.S.C. 154(b) by 473 days.

(21) Appl. No.: 14/635,548

(22) Filed: Mar. 2, 2015

(65) Prior Publication Data

US 2015/0246380 A1 Sep. 3, 2015

Related U.S. Application Data

(60) Provisional application No. 61/946,137, filed on Feb. 28, 2014.

(51) Int. Cl.
| | |
|---|---|
| *B25J 5/02* | (2006.01) |
| *B08B 13/00* | (2006.01) |
| *B25J 19/00* | (2006.01) |
| *B25J 21/00* | (2006.01) |

(52) U.S. Cl.
CPC ............... *B08B 13/00* (2013.01); *B25J 5/02* (2013.01); *B25J 19/0066* (2013.01); *B25J 21/00* (2013.01)

(58) Field of Classification Search
CPC .................................................... B25J 19/0066
See application file for complete search history.

(56) References Cited

U.S. PATENT DOCUMENTS

| | | | | |
|---|---|---|---|---|
| 3,940,577 | A | * | 2/1976 | Christofer ............ H02G 11/02 191/12 R |
| 4,090,230 | A | | 5/1978 | Fuller |
| 4,438,701 | A | * | 3/1984 | Murai ..................... B61B 10/04 104/140 |
| 4,850,382 | A | | 7/1989 | Williams |
| 5,385,089 | A | * | 1/1995 | Newsom .............. B30B 9/3003 100/179 |
| 5,473,991 | A | * | 12/1995 | Crum ..................... A47F 10/04 104/172.2 |
| 6,073,640 | A | | 6/2000 | McTaggert |
| 7,516,967 | B2 | * | 4/2009 | Schwei ..................... A61L 2/18 134/15 |

(Continued)

FOREIGN PATENT DOCUMENTS

| | | | |
|---|---|---|---|
| CN | 101284379 A | 10/2008 | |
| CN | 202015139 U | * 10/2011 | ............ A47L 11/293 |

(Continued)

*Primary Examiner* — Michael E Barr
*Assistant Examiner* — Cristi J Tate-Sims
(74) *Attorney, Agent, or Firm* — Quinn IP Law

(57) ABSTRACT

A machine assembly, such as a parts washer, includes an enclosure defining an interior and an exterior. A robot is disposed within an interior of the disclosure. The assembly includes a plurality of camrollers operatively connectable to a robot. The assembly also includes a rail extending from within the interior of the enclosure to the exterior of the enclosure for engaging with the plurality of camrollers.

9 Claims, 11 Drawing Sheets

(56) References Cited

U.S. PATENT DOCUMENTS

| | | | | |
|---|---|---|---|---|
| 7,621,285 | B2* | 11/2009 | Robert | B08B 3/022 |
| | | | | 134/61 |
| 8,800,745 | B2* | 8/2014 | Spangler | B65G 35/066 |
| | | | | 118/323 |
| 2002/0027742 | A1 | 3/2002 | Ostwald et al. | |
| 2003/0129048 | A1* | 7/2003 | Grubbs | B62B 5/0083 |
| | | | | 414/548 |
| 2006/0292308 | A1 | 12/2006 | Clifford et al. | |
| 2012/0207572 | A1* | 8/2012 | Enenkel | B65G 67/08 |
| | | | | 414/502 |
| 2013/0200644 | A1* | 8/2013 | Shiomi | B25J 15/00 |
| | | | | 294/207 |
| 2013/0233359 | A1* | 9/2013 | Meissner | B08B 3/02 |
| | | | | 134/134 |
| 2014/0205403 | A1* | 7/2014 | Criswell | B25J 5/007 |
| | | | | 414/395 |

FOREIGN PATENT DOCUMENTS

| | | |
|---|---|---|
| CN | 103028570 A | 4/2013 |
| CN | 103612037 A | 3/2014 |
| CN | 203635532 U | 6/2014 |
| CN | 203650098 U | 6/2014 |
| JP | H10252396 A | 9/1998 |

\* cited by examiner

US 9,968,974 B2

ASSEMBLY AND METHOD FOR REMOVING A ROBOT FROM AN ENCLOSURE

CROSS REFERENCE TO RELATED APPLICATION

This application claims the benefit of provisional patent application No. 61/946,137, filed Feb. 28, 2014, which is hereby incorporated by reference.

TECHNICAL FIELD

The technical field relates in general to robots disposed in enclosures and more specifically to moving robots into and out of the enclosures.

BACKGROUND

Some industrial machinery, for example, part washing machines, typically include a robot to perform certain tasks. For instance, the robot may be utilized to move a production part from one washing cell to another washing cell. Often, it is necessary and/or desirable to totally enclose the robot within an enclosure. This may be done for safety reasons, to prevent human interference with the robot, to contain water within the enclosure, and/or to reduce noise.

Difficulties often arise when the robot must be serviced, replaced, and/or otherwise removed from the machine. In such instances, maintenance crews typically must disassemble all or part of the enclosure to access the robot. One technique involves removing a top (i.e., a room) of the enclosure and then lifting the robot out with a crance. Regardless, enclosure disassembly often results in a very time consuming process that may also result in damage to the machine and/or the robot.

As such, it is desirable to present an assembly and method for easily removing a robot from an enclosure without disassembly of the enclosure. In addition, other desirable features and characteristics will become apparent from the subsequent summary and detailed description, and the appended claims, taken in conjunction with the accompanying drawings and this background.

BRIEF SUMMARY

A machine assembly, according to one embodiment, includes an enclosure defining an interior and an exterior. The assembly includes a plurality of camrollers operatively connectable to a robot. The assembly also includes a rail extending from within the interior of the enclosure to the exterior of the enclosure for engaging with the plurality of camrollers.

A washer assembly, according to one embodiment, includes an enclosure defining an interior and an exterior. A robot is disposed within the enclosure. A plurality of camrollers are operatively connected to the robot. A rail extends from within the interior of the enclosure to the exterior of the enclosure.

A method of moving a robot out of an enclosure, according to one embodiment, includes disposing a rail extending from an interior of the enclosure to an exterior of the enclosure. The method also includes raising the robot away from a floor of the enclosure. The method further includes operatively connecting a plurality of camrollers to the robot. The method also includes lowering the robot onto the rail such that the robot is supported on the rail by the camrollers. The method further includes moving the robot out of the enclosure.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the figures, wherein like numerals indicate like parts throughout the several views, a machine assembly 100, and a method of removing a robot 102 from a robot enclosure 103 of the machine assembly 100, is shown and described herein. In the illustrated embodiment, the machine assembly 100 is an industrial parts washer (not separately numbered). However, it should be appreciated that the machine assembly 100 may be implemented with other types of machinery. It should also be appreciated that the robot 102 described herein may be utilized with other devices. As such, the method of removing the robot 102 from the robot enclosure 103 may also be practiced with other machinery and assemblies besides the illustrated machine assembly 100.

Figure 1:
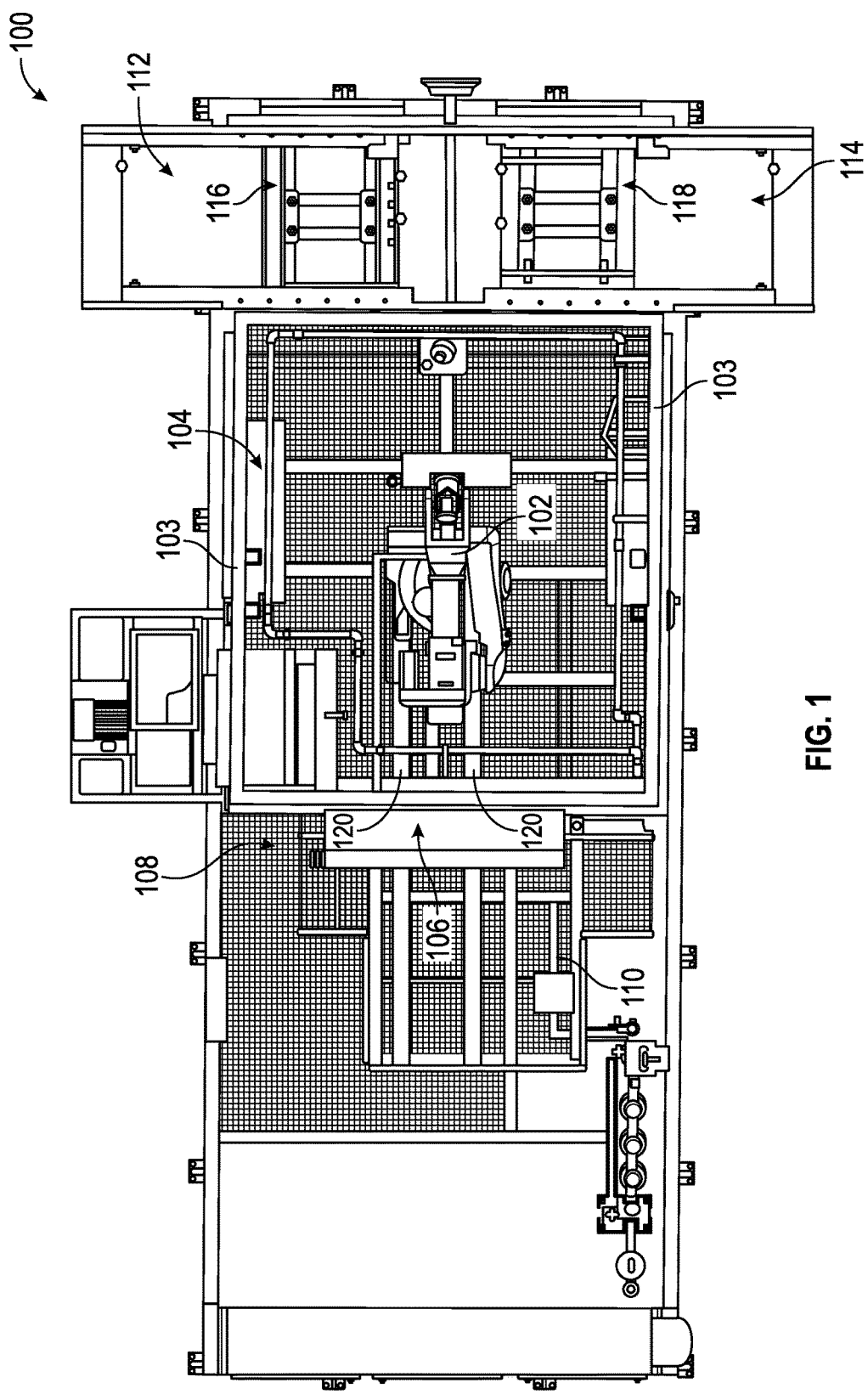
FIG. 1 is top view of a washer assembly showing an exterior, an interior, and a pair of washer chambers in accordance with an embodiment.

Referring to FIG. 1, the robot 102 is typically disposed within an interior 104 of the robot enclosure 103. The robot enclosure 103 encloses the robot 102 on all sides (not numbered), including a top (not shown) and a bottom (not numbered). As such, persons and/or other equipment are protected from movements of the robot 102. In the illustrated embodiment, the robot 102 moves one or more parts (not shown) from a first washer chamber 112 to a second washer chamber 114 through apertures (not shown) in the sides of the enclosure 103. Doors (not shown) serve to open and close the apertures.

A washing apparatus 116 and/or a drying apparatus 118 are configured to wash and/or dry parts placed in each of the chambers 112, 114. In the illustrated embodiment, the washing apparatus 116 is disposed in the first chamber 112 and a drying apparatus 118 is disposed in the second chamber 114. Of course, other configurations for washing and/or drying parts will be appreciated by those skilled in the art.

The enclosure 103 also defines an access opening 106 to allow access to the interior 104 of the enclosure 103 from an exterior 108. More specifically, in the illustrated embodiment, the access opening is defined by one of the sides of the enclosure 103. A door (not numbered) is utilized to open and close the access opening 106. The assembly 100 further includes an exterior platform 110 outside of the enclosure 103 and adjacent to the access opening 106. As such, the exterior platform 110 provides access to the interior 104 of the enclosure 103 through the access opening 106.

Figure 2:
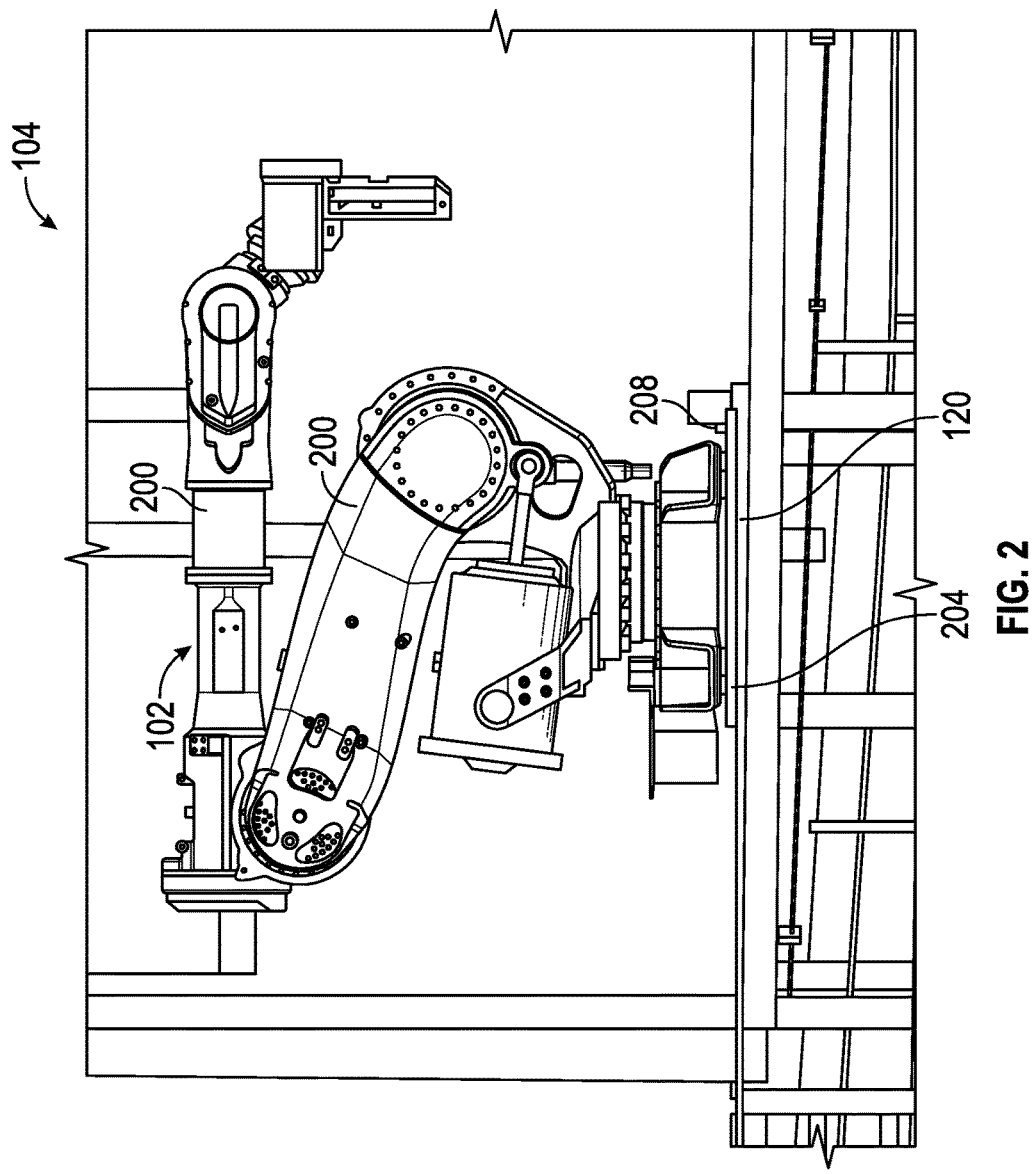
FIG. 2 is a side view of a robot disposed in the interior in accordance with an embodiment.

FIG. 2 illustrates the robot 102 in a normal operating position within the robot enclosure 103. In the illustrated embodiment, the robot 102 includes a plurality of arms 200 movable about a plurality of axis (not numbered), as is well known to those skilled in the art. The robot 102 is securely fastened to a subplate 204. The subplate 204 is attached to a rigid structure 206 with at least one fastener 208. In the illustrated embodiment, the fastener 208 includes a threaded bolt (not separately numbered). However, other techniques for implementing the fastener 208 are readily appreciated by those skilled in the art.

During normal operation of the machine assembly 100, as described above, the subplate 204 is securely fastened to the rigid structure 206. However, in the illustrated embodiment, the method of removing the robot 102 from the robot enclosure 103 includes unfastening the subplate 204 from the rigid structure 206 by removing and/or otherwise unfastening the fastener 208.

Figure 3:
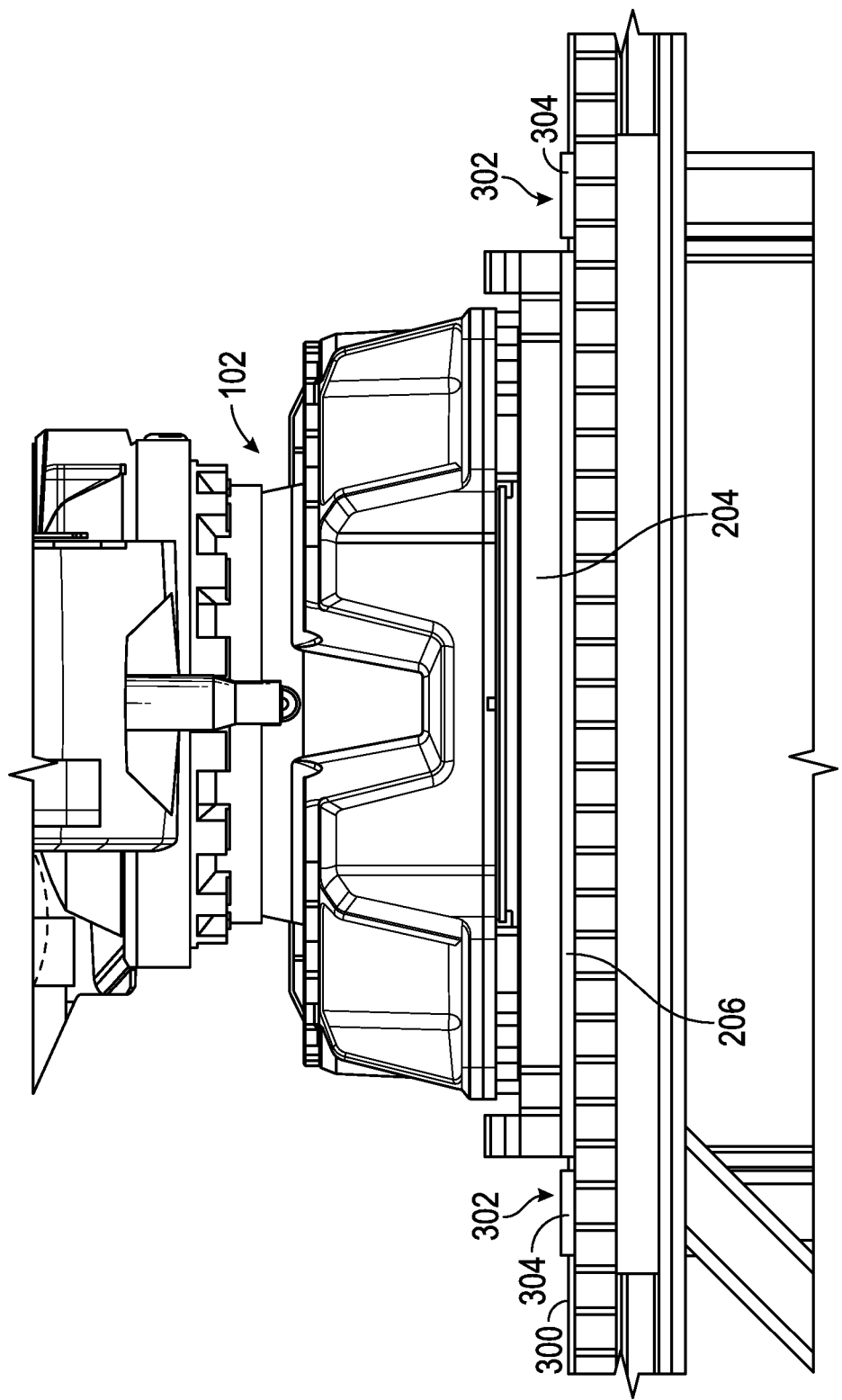
FIG. 3 is a partial front view of the robot in a normal operating condition in accordance with an embodiment.
Figure 4:
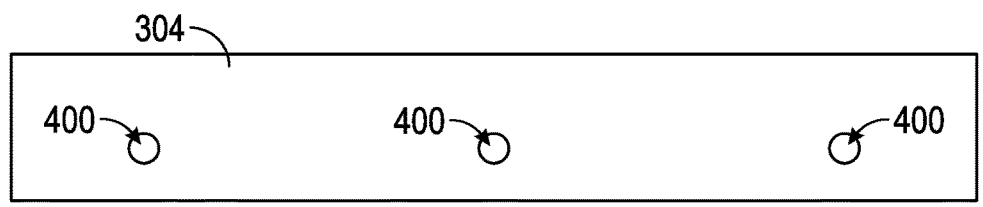
FIG. 4 is a top view of a track portion of a rail in accordance with an embodiment.

Referring now to FIG. 3, the machine assembly 100 of the illustrated embodiment includes a floor 300. The rigid structure 206 in the illustrated embodiment is disposed on the floor 300. The machine assembly 100 also includes at least one rail 302. In the illustrated embodiment, a pair of rails 302 is utilized. Each rail 302 may be divided into a plurality of segments, such that a continuous rail 302 is not necessary. In the illustrated embodiment, each rail 302 includes a track portion 304 formed of a metal; however, other materials may also or alternatively be utilized to form the track portion 304. The track portion 304 is generally flat and/or flush against the floor 300 to reduce a tripping hazard. As shown in FIG. 4, each track portion 304 may define one or more holes 400. The holes 400 in the illustrated embodiment are threaded.

The rails 302 extend from the interior 104 of the robot enclosure 103, through the access opening 106, to the exterior 108 of the assembly 100. That is, in addition to being supported by the rigid structure 206 of the enclosure 103, the rails 302 are also supported by the exterior platform 110.

Figure 5:
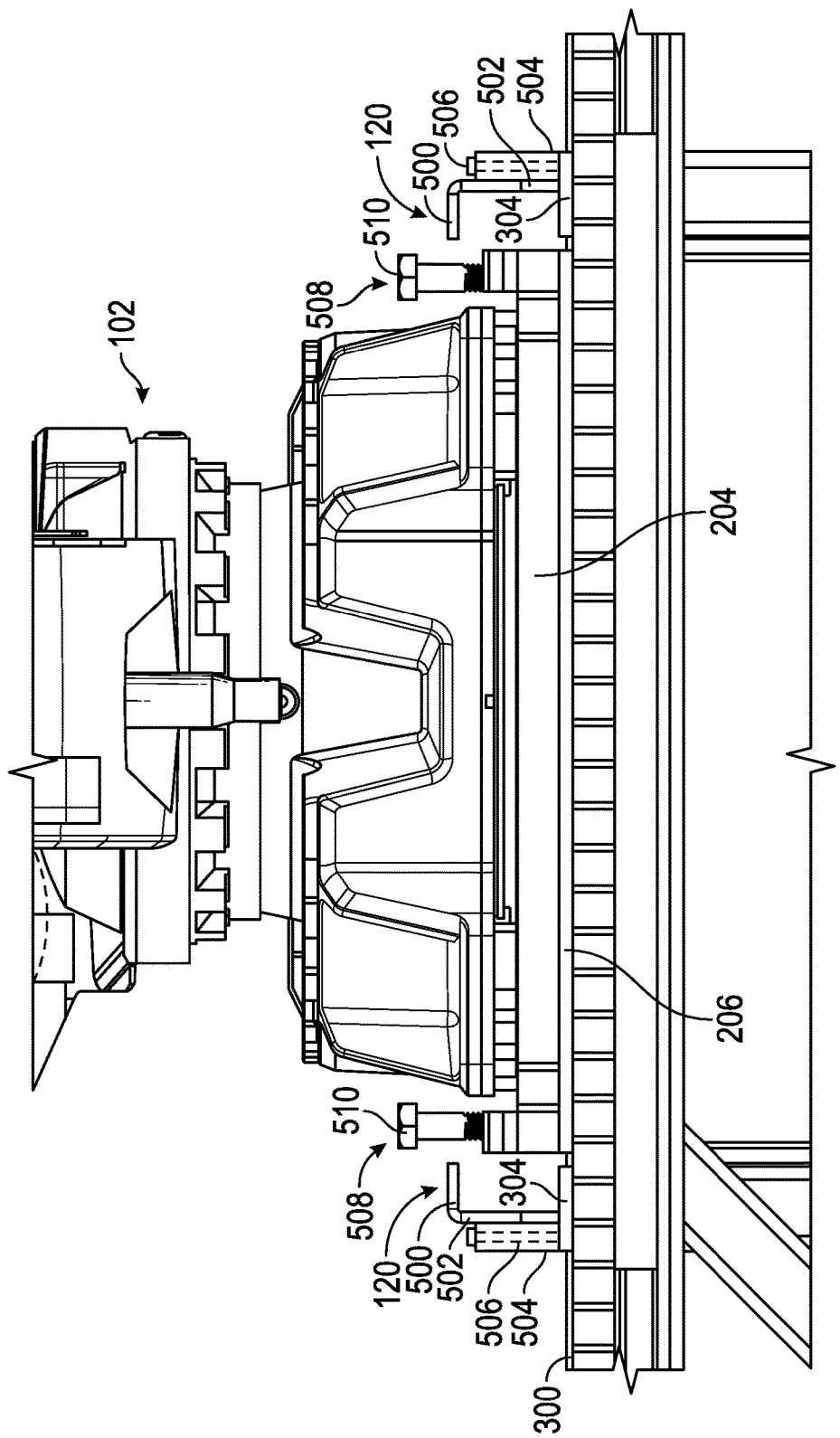
FIG. 5 is a partial front view of the robot after attachment of a trap portion of the rail to the track portion of the rail in accordance with an embodiment.

With reference now to FIG. 5, in the illustrated embodiment, each rail 302 includes a trap portion 500 disposed above the track portion 304. The trap portion 500 in the illustrated embodiment is generally parallel with the track portion 304. The trap portion 500 may be installed and/or removed as necessary to prevent a trip hazard. The trap portion 500 is typically installed when the robot is to be removed.

Each rail 302 also includes a support part 502 disposed between the track portion 304 and the trap portion 500. The support part 502 is generally perpendicular to the track portion 304 and the trap portion 500 and supports the trap portion 500 above the track portion 304. In the illustrated embodiment, the support part 502 and the trap portion 500 are formed of a single piece of metal and bent at about a 90° angle. However, other techniques of coupling the support part 502 to the trap portion 500 will be appreciated by those skilled in the art.

Each rail 302 of the illustrated embodiment also includes at least one post 504. The post 504 is formed of a metal and is connected to the support part 502 by weld or another appropriate technique. As seen in FIG. 5, the post 504 has a generally rectangular cross-section and extends longitudinally from the track portion 304 towards the trap portion 500. The post 504 defines a void (not numbered) disposed longitudinally therethrough and having a cylindrical shape. The void of the post may be aligned with one of the holes 400 of the track portion 304. A threaded bolt 506 may be disposed through the void and attached to the threads of the hole 400 to secure the trap portion 500 and the support part 502 in place with respect to the track portion 304.

Accordingly, the method of removing the robot 102, according to one embodiment, includes installing the trap portion 500 of each rail 302 above the track portion 304 of each rail 302. The method also includes securing the trap portion 500 to the track portion 304.

The method of removing the robot 102 further includes raising the robot 102 away from the rigid structure 206 and/or the floor 300. In the illustrated embodiment, the robot 102 and the subplate 204 are raised away from the rigid structure 206 and the floor 300. A mechanism 508 is utilized to raise the robot 102 and/or the subplate 204. Specifically, in the illustrated embodiment, the mechanism 508 includes a plurality of jackbolts 510. The jackbolts 510 are threaded through the subplate 204 and engage the rigid structure 206. More specifically, in the illustrated embodiment, four jackbolts 510 are utilized.

Figure 6:
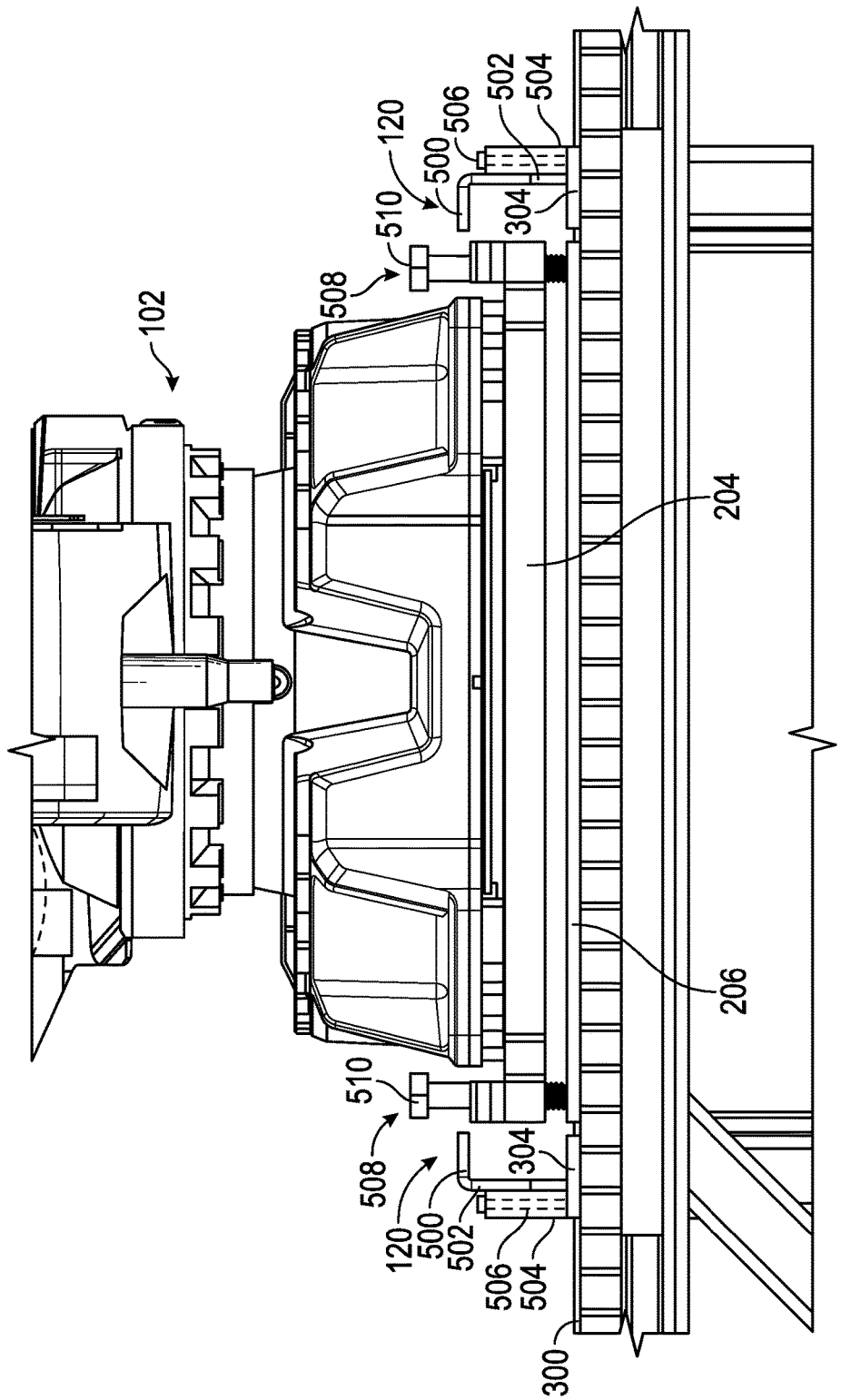
FIG. 6 is a partial front view of the robot after raising of the robot in accordance with an embodiment.
Figure 7:
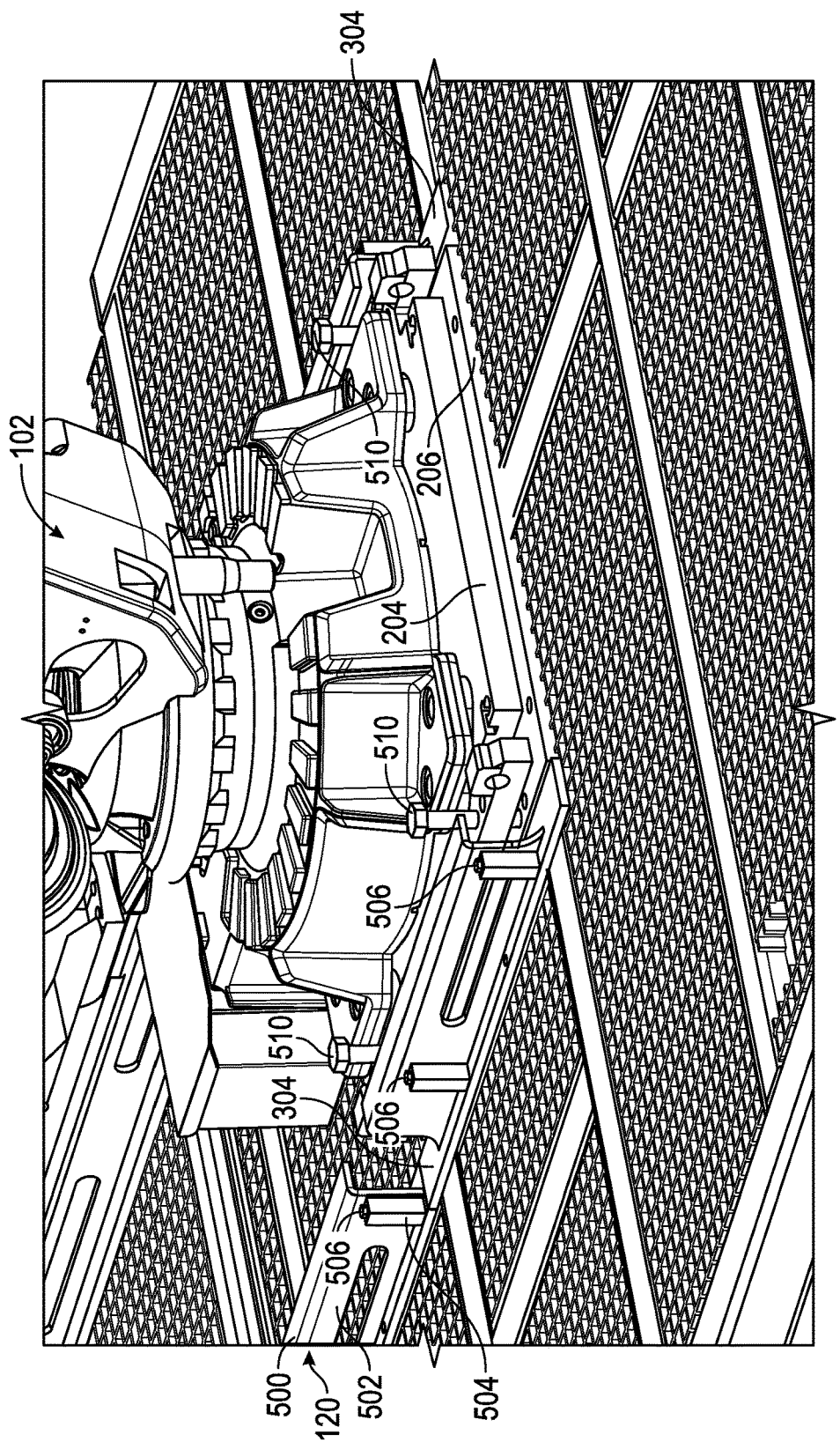
FIG. 7 is a partial perspective view of the robot after raising of the robot in accordance with an embodiment.

As the jackbolts 510 are rotated, the subplate 204, and the robot 102, are lifted up and away from the rigid structure 206, as shown in FIGS. 6 and 7. In the illustrated embodiments, the jackbolts 510 are each M24-3.0×100 mm large hex head screws. Of course, other suitable jackbolts 510 may be utilized depending on the weight of the robot 102 and the subplate 204 and other factors. Furthermore, in other embodiments (not shown), other techniques for raising the robot 102 and the subplate 204 away from the rigid structure 206 may be implemented.

In one embodiment, rotation of the jackbolts 510 to raise the robot 102 and the subplate 204 may be done manually using a tool (not shown), e.g., a hand wrench or a hand held drill motor. In another embodiment, rotation of the jackbolts 510 may be accomplished with an automatic technique. For instance, the robot 102 may carry a tool to actuate rotation of the jackbolts 510 and be configured to rotate the jackbolts 510, to raise itself, when so commanded.

In other embodiments (not shown), raising of the robot 102 may be performed with mechanisms other than the jackbolts 510. For instance, pneumatic, hydraulic, and/or electromechanical mechanisms may be implemented to raise the robot 102. In further embodiments (not shown), one or more electric motors may engage the jackbolts 510 such that the jackbolts 510 are turned simultaneously at about the same speed. As such, the robot 102 remains level during raising.

Figure 8:
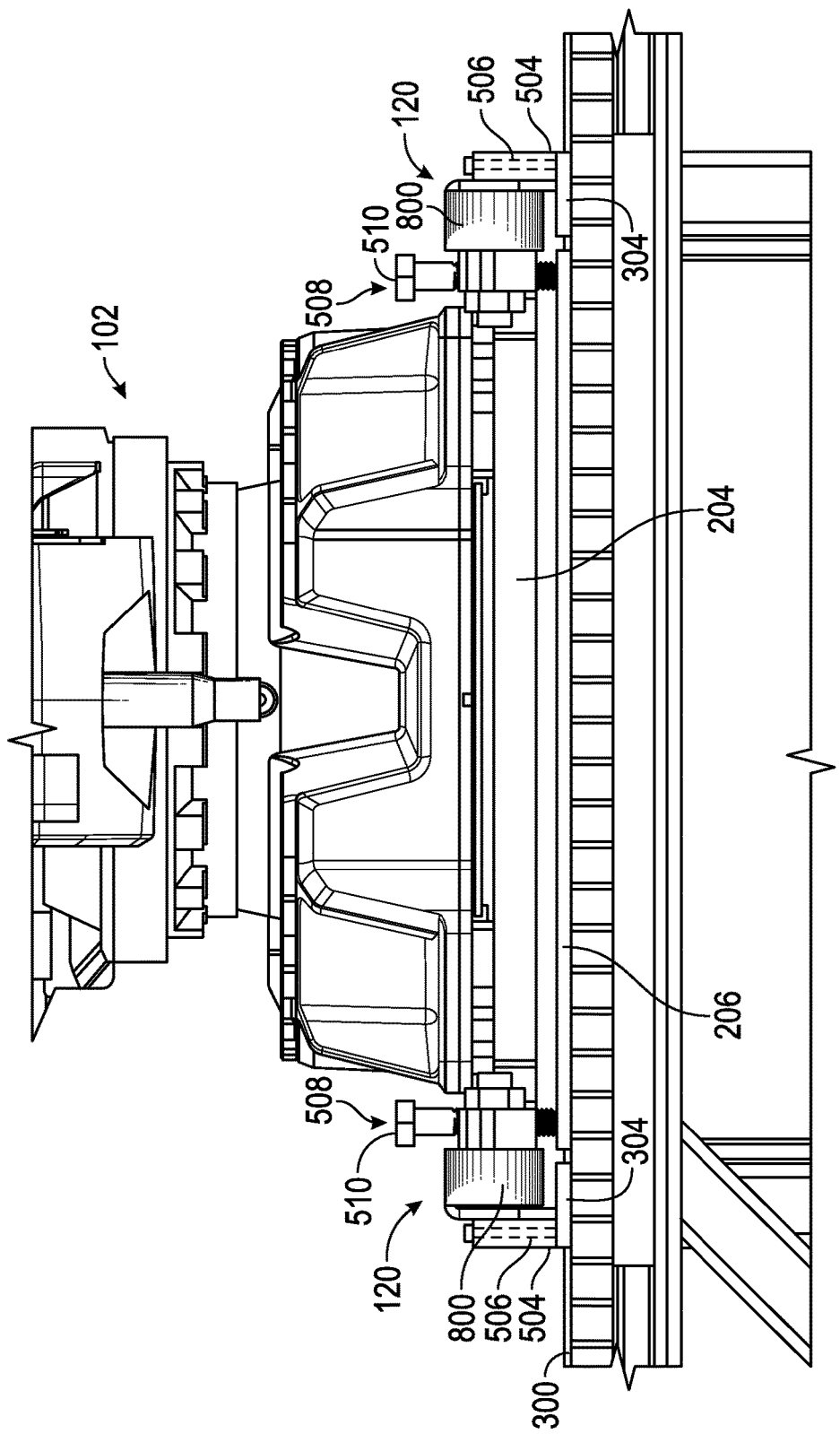
FIG. 8 is a partial front view of the robot after attachment of camrollers in accordance with an embodiment.

Referring now to FIG. 8, the method further includes operatively connecting a plurality of camrollers 800 to the subplate 204. Specifically, in the illustrated embodiment, four camrollers 800 are operatively connected to the subplate. The camrollers 800 of the illustrated embodiment are McGill® PCF-3½ TRAKROL® cam follower bearings, manufactured by Emerson Industrial Automation of St. Louis, Mo.

Figure 9:
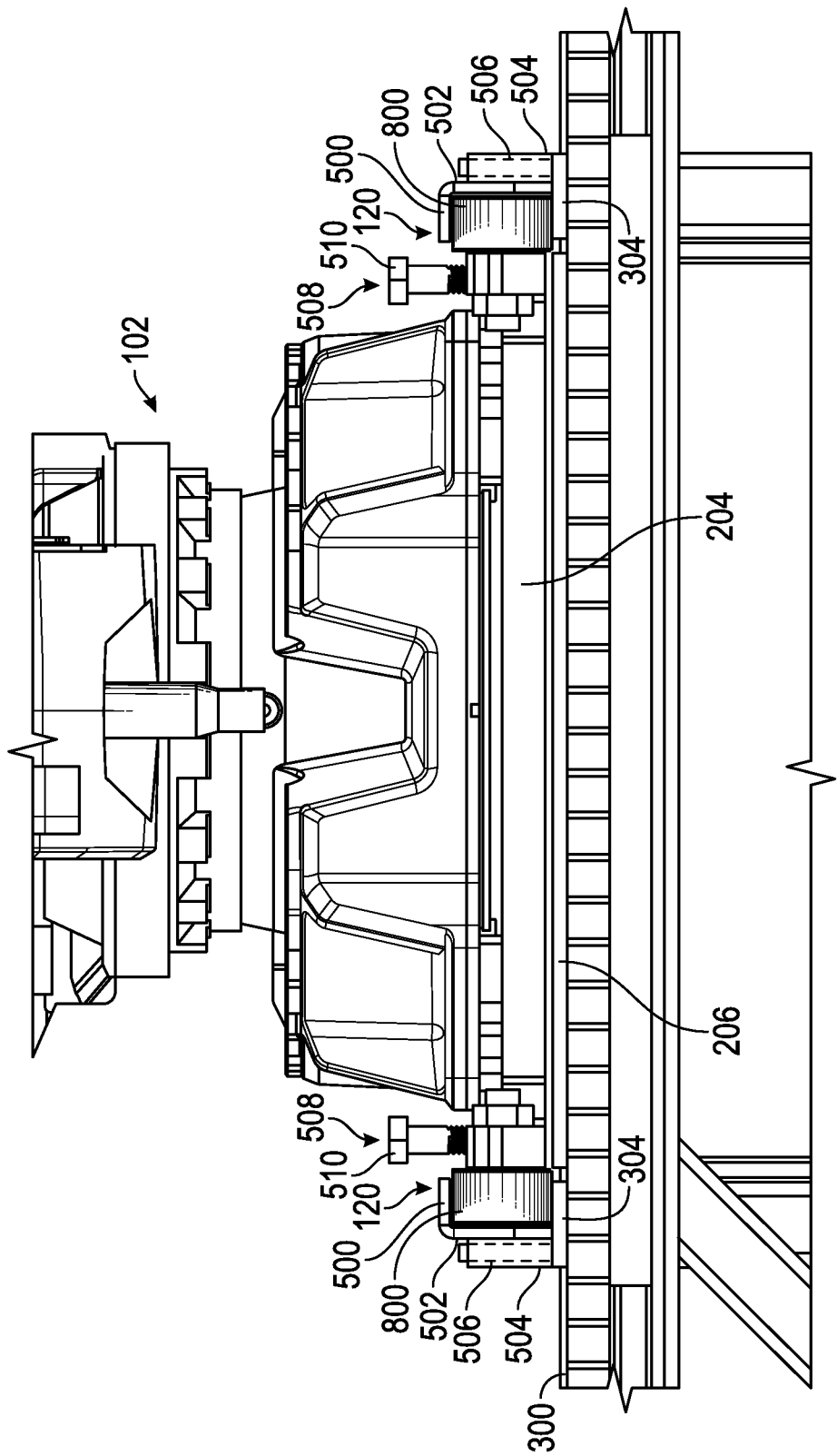
FIG. 9 is a partial front view of the robot after being lowered such that the camrollers engage with the track portion of the rail in accordance with an embodiment.

With reference now to FIG. 9, the method further includes lowering the subplate 204 and the robot 102 such that the camrollers 800 engage with the rails 302. More specifically, in the illustrated embodiment, the camrollers 800 are lowered to engage with the track portion 304 of the rails 302. When the robot 102 is lowered, the camrollers 800 are disposed below the trap portion of the rails 302. The trap portion serves to retain the camrollers 800 on the rail and prevent unexpected vertical movement of the robot 102.

Lowering the subplate 204 and the robot 102 may be achieved by rotating the jackbolts 510. This rotation may be performed manually using a tool (not shown). In another embodiment, rotation of the jackbolts 510 may be accomplished with an automatic technique.

Figure 10:
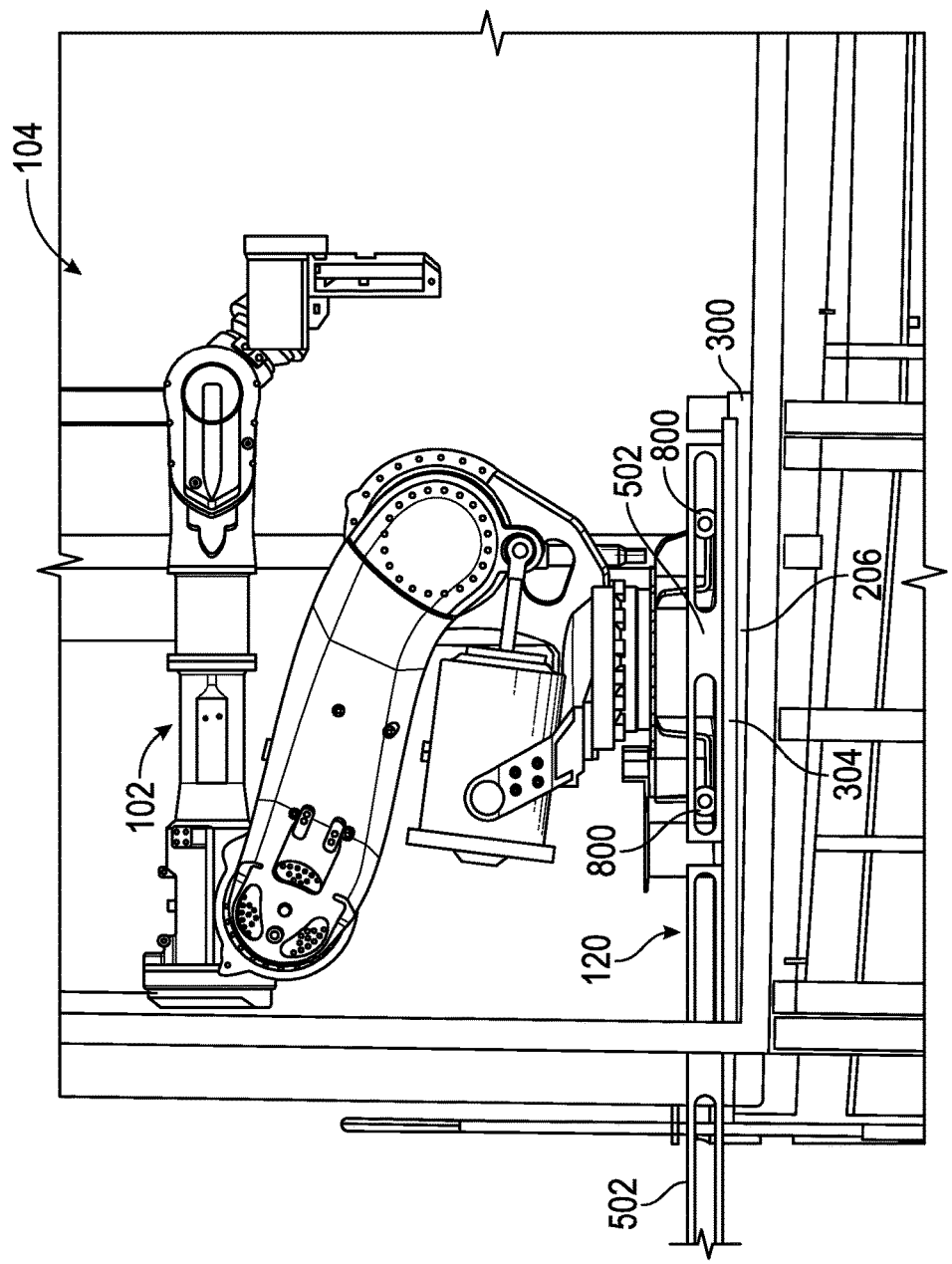
FIG. 10 is a side view of the robot after being lowered in accordance with an embodiment.
Figure 11:
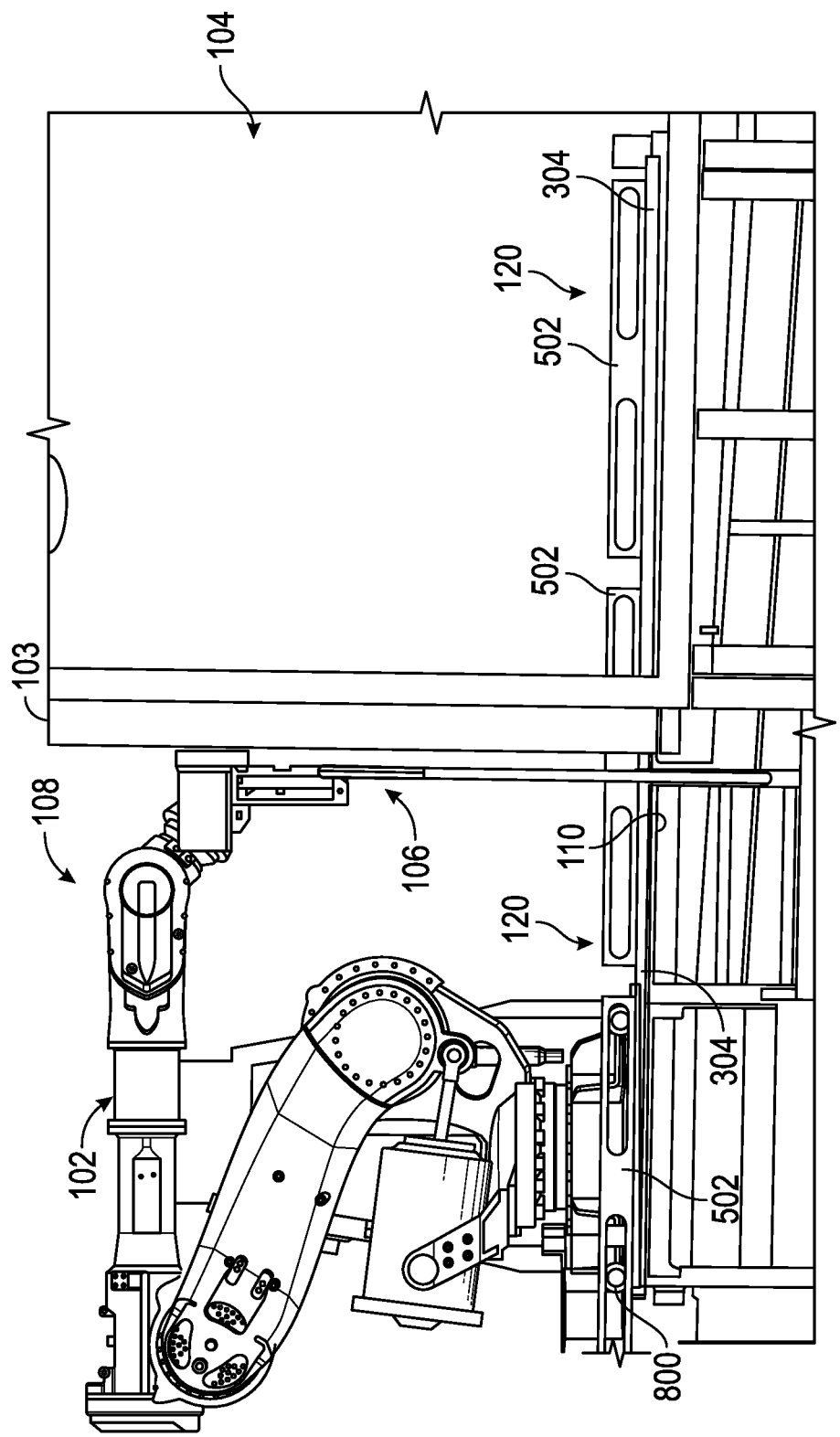
FIG. 11 is a side view of the robot after being moved from the interior of the enclosure to an exterior.

Once the camrollers 800 are engaged with the rails 302, the robot 102 may then be easily moved out of the interior 104 of the enclosure 103 to the exterior 108, as shown in FIGS. 10 and 11. In the illustrated embodiment, the robot 102 may be manually pushed and/or pulled to move along the rails 302. However, in other embodiments, the camrollers 800 may be substituted with driven systems (not shown) to automatically move the robot 102 between the exterior 108 and the interior 104 of the enclosure 103. Once located outside of the enclosure 103, the robot may be conveniently serviced while on the platform 110 or easily removed from the platform 110.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A washer assembly for servicing a robot outside an enclosure comprising:
    a floor;
    an enclosure defining an interior and an exterior;
    a robot disposed within the enclosure for moving one or more parts from a first washing position to a second washing position;
    a plurality of camrollers removably attached to said robot; and
    a rail removably attached to the floor and extending from within said interior of said enclosure to said exterior of said enclosure,
    wherein said rail directly contacts and supports said plurality of camrollers for moving the robot into and out of the enclosure;
    wherein said rail includes a track portion and a trap portion,
    wherein said trap portion is attached to and parallel with said track portion, and
    wherein said trap portion is disposed above said track portion with said plurality of camrollers disposed between the track portion and the trap portion for securing the robot to the rail.

2. The washer assembly as set forth in claim 1, further comprising a mechanism operatively connected to said robot to raise and/or lower said robot.

3. The washer assembly as set forth in claim 2, wherein said mechanism comprises at least one jack bolt.

4. The washer assembly as set forth in claim 3, wherein said mechanism comprises an electric motor operatively connected to said at least one jack bolt.

5. The washer assembly as set forth in claim 1, further comprising a washer apparatus for washing a part.

6. The washer assembly as set forth in claim 5, further comprising a washer chamber separate from said interior of said enclosure.

7. The washer assembly as set forth in claim 5, further comprising a plurality of washer chambers each separate from said interior of said enclosure.

8. A method of moving a robot out of an enclosure of a washer assembly for servicing having an enclosure defining an interior and an exterior, a robot disposed within the enclosure for moving one or more parts from a first washing position to a second washing position, comprising:
    disposing a rail on a floor, such that the rail extends from an interior of the enclosure to an exterior of the enclosure;
    raising the robot away from the floor of the enclosure;
    attaching a plurality of camrollers to the robot;
    lowering the robot onto the rail such that the robot is supported on the rail by the camrollers; and
    moving the robot out of the enclosure;
    wherein the rail includes a track portion for engaging the camrollers and further comprising installing a trap portion of each rail above and parallel with the track portion of each rail for securing the camrollers between the track portion and the trap portion.

9. The method as set forth in claim 8, wherein said raising the robot away from a floor comprises rotating a plurality of jackbolts which engage a rigid structure parallel to the floor of the enclosure.

* * * * *